March 12, 1963 E. WÜNSCHE 3,081,368
POSITIVE PLATE OF A STORAGE BATTERY AND A POROUS
TUBULAR SHEATHING FOR A ROD OF SUCH PLATE
Filed Nov. 13, 1959
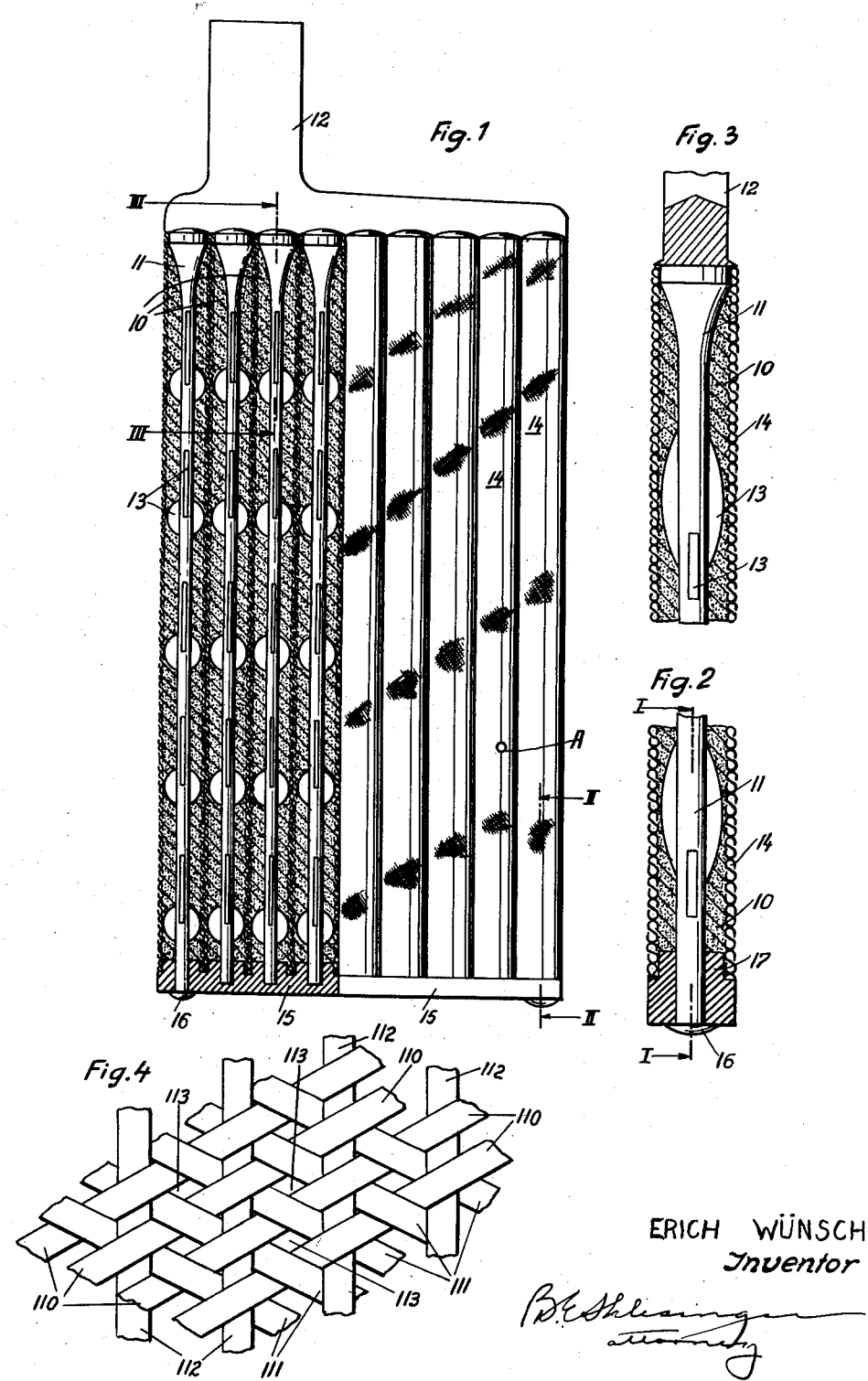
ERICH WÜNSCHE
Inventor United States Patent Office 3,081,368
Patented Mar. 12, 1963

3,081,368
POSITIVE PLATE OF A STORAGE BATTERY AND A POROUS TUBULAR SHEATHING FOR A ROD OF SUCH PLATE
Erich Wünsche, Berlin-Marienfelde, Germany, assignor to Accumulatorenfabrik Sonnenschein G.m.b.H., Budingen, Upper Hesse, Germany, a limited-liability company of Germany
Filed Nov. 13, 1959, Ser. No. 852,848
Claims priority, application Germany Nov. 17, 1958
2 Claims. (Cl. 136—43)

My invention relates to a positive plate of a storage battery comprising a row of parallel rods of active material and to a porous tubular sheathing for such a rod.

The object of my invention is an improved sheathing consisting of braided filaments of a plastic, such sheathing combining a high degree of porosity and consequent permeability with great mechanical strength and resistivity to acids.

More particularly, it is the object of my invention to provide an improved tubular sheathing which consists of braided filaments of a plastic and differs from prior sheathings of that type by non-stretchability and non-compressibility in lengthwise direction. Braided tubular sheathings of the kind known heretofore comprise two groups of helical threads crossing each other and, as a result, may be easily stretched or compressed lengthwise, since the helical threads can easily yield to axial stresses by a simple change of their helix angle, and, therefore, are not capable of resisting axial forces.

Finally, it is an object of my invention to provide an improved braided sheathing which is axially non-stretchable and non-compressible and still is highly porous and very thin and does not require any additional outer protective tubular sleeve which would reduce the permeability and would increase the distance between the rods of active material in the battery.

Further objects of my invention will appear from a detailed description of a preferred embodiment of my invention following hereinafter with reference to the accompanying drawing. It is to be understod, however, that my invention is in no way limited to such details but is capable of numerous modifications within the scope of the appended claims and that the terms and phrases used in such detailed description have been chosen for the purpose of explaining the invention rather than that of restricting or limiting the same.

In the accompanying drawings—

FIG. 1 is a side view of a positive plate of a storage battery constructed in accordance with my invention, such plate being partly shown in section along a plane indicated by the line I—I in FIG. 2, FIG. 2 is a partial section taken along the plane indicated by line II—II in FIG. 1 shown on an enlarged scale, FIG. 3 is the section along a plane indicated in FIG. 1 by the line III—III shown on an enlarged scale and, FIG. 4 is a magnified view of a wall area of the braided sheathing, such area being indicated in FIG. 1 by the circle A.

My improved positive plate for a storage battery as illustrated in FIGS. 1, 2 and 3 comprises a row of parallel rods 10 of active material, each such rod being reinforced by a core 11 in form of a metal rod which is integral at its upper end with a lug 12 serving to connect the plate in circuit. Preferably, the rods 11 and the lugs 12 consist of a suitable lead alloy. Each of the rods 11 may be formed with suitable lateral flanges 13. Each rod 10 of active material has preferably a circular cross section and is surrounded by a sheathing 14 that consists of braided filaments of a suitable plastic, such as low pressure-polypropylene or low pressure-polyethylene. These plastics are highly resistant against acids of the kind used in storage batteries and have a high tensile strength and elasticity. These properties are desirable because the rods 10 are liable to expand in operation in diametrical direction and, therefore, would cause breakage of the sheathing, unless the elements thereof are highly elastic.

A bottom bar 15 is mounted on the lower ends of the rods 10 and is formed with suitable bores accommodating the projecting lower ends of the core rods 11. Some of these rods may project through the bottom bar 15 and may be formed with rivet heads 16, as shown in FIGS. 1 and 2, to thereby maintain the bottom bar 15 and the lug 12 in spaced relationship at a predetermined distance from each other.

Preferably, the bottom bar 15 is provided at its top with a plurality of lugs 17 of circular cross section which are co-axially disposed with respect to the rods 10 and have the same diameter as such rods. The sheathings 14 preferably project beyond the lower ends of the rods 10 and surround the lug 17, as shown in FIG. 2.

The bottom rod 15 may be formed of a suitable acid-resistive plastic capable of being welded to the sheathings.

As shown in FIG. 4, each sheathing consists of helical threads 110 constituting right-hand helices and helical threads 111 constituting left-hand helices, the two kinds of threads crossing each other in the manner conventional in braided sheathing. Hence, each thread 110 passes alternately on the outside and on the inside across the threads 111. Similarly, each thread 111 crosses a thread 110 alternately on the outside and on the inside of the sheathing. In the absence of additional elements, however, a sheathing so braided would not be able to resist forces tending to stretch or to compress the sheathing in axial direction because under the effect of such forces the angle only would change at which the threads 110 and 111 cross each other.

If such a sheathing is applied to a rod 10 of active material, it might happen that under the influence of vibrations the sheathing would gradually contract in axial direction and would slip from the lugs 17 of the bottom bar 15 so that the active material that might break loose from the rod 10 would leak out and might gradually fill up the space between the positive and negative plates of the storage battery and would eventually shortcircuit the same. For this reason, it is the object of my invention to reinforce the sheathing 14 in axial direction without reducing its porosity and without materially increasing its thickness.

I have attained this object by providing an additional group of threads 112 which extend parallel to the axis of the sheathing throughout the length of the latter and are so disposed between the crossing points of the helical threads 110 and 111 that they are crossed on their outside by the helical threads 110 and are crossed on their inside by the helical threads 111. Therefore, at each of these cross points the three threads 110, 111 and 112 are disposed in superimposed relationship.

Each of the threads may be formed by a single filament which may have a diameter of .18 mm. where the outer diameter of the sheathings amounts to 9.7 mm., for example. Alternatively, however, each thread may be formed by a strand of parallel filaments in order to reduce the thickness of the sheathing, as it is desirable to make the sheathings as thin as possible so that they require a minimum of space and afford a compact structure of the positive plate.

The parallel filaments constituting a strand may be so arranged as to form a flat ribbon.

At the ends of the sheathing the threads are preferably welded to each other by the application of heat for a brief period of time. This is desirable to prevent the threads at the ends of the sheathing from becoming loose.

In the embodiment of the braided sheathing illustrated in FIG. 4 the helical threads 110 cross the helical threads 111 also at such points as are located between the threads 112 extending parallel to the axis. If desired, additional threads extending parallel to the axis could be disposed at such points. Preferably, however, such threads are omitted in order to leave the pores 113 unobstructed at such points. This is desirable in order to increase the porosity of the sheathing.

The embodiment of the sheathing shown in FIG. 4 is capable of numerous modifications. Thus, it would be possible to omit either the threads 110 or the threads 111. Moreover, the different threads may have different diameters or widths.

I have found that a sheathing having an external diameter of 9.7 mm. can be effectively reinforced by the provision of ten lengthwise extending threads 112, each such thread being formed by a single filament having a diameter of 0.18 mm.

From the foregoing it will be seen that this invention is one well adapted to attain all of the ends and objects hereinabove set forth, together with other advantages which are obvious and which are inherent to the apparatus.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. A plate of a storage battery comprising a row of parallel rods of active material reinforced by a centrally-disposed metal core, each rod having an inactive tubular sheathing consisting of braided strands of acid-resistant, high-tensile strength, elastic filaments, said strands comprising both helical strands and strands extending parallel to the axis of said sheathing, some of said helical strands being of left hand and the rest of said helical strands being of right hand, each strand being composed of a multiplicity of parallel filaments forming a flat ribbon, said filaments consisting of a plastic selected from the group comprising low pressure-polypropylene and low pressure-polyethylene.

2. A plate as claimed in claim 1 in which the braided filaments are interconnected by welding at the ends of the tubular sheathing.

References Cited in the file of this patent

UNITED STATES PATENTS

| | | |
|---|---|---|
| 490,254 | Lloyd | Jan. 17, 1893 |
| 2,076,667 | Pombo | Apr. 13, 1937 |
| 2,114,274 | Huppert | Apr. 12, 1938 |
| 2,176,428 | Kershaw | Oct. 17, 1939 |
| 2,195,211 | Hall | Mar. 26, 1940 |
| 2,257,018 | White | Sept. 23, 1941 |
| 2,305,121 | Wheat | Dec. 15, 1942 |
| 2,350,752 | Graf | June 6, 1944 |
| 2,373,281 | White | Apr. 10, 1945 |
| 2,420,456 | White | May 13, 1947 |
| 2,937,221 | Lindgren | May 17, 1960 |

FOREIGN PATENTS

| | | |
|---|---|---|
| 118,789 | Austria | Aug. 24, 1944 |
| 570,266 | Italy | Dec. 5, 1957 |